(12) United States Patent
Julian et al.

(10) Patent No.: US 8,764,990 B1
(45) Date of Patent: Jul. 1, 2014

(54) LIQUID/REFUSE SEPARATION SYSTEM

(76) Inventors: Matthew Raymond Julian, Goodlettsville, TN (US); Brian Douglas Jackson, Ramer, TN (US)

(*) Notice: Subject to any disclaimer, the term of this patent is extended or adjusted under 35 U.S.C. 154(b) by 363 days.

(21) Appl. No.: 13/017,900

(22) Filed: Jan. 31, 2011

(51) Int. Cl.
*B01D 37/00* (2006.01)
*B01D 29/11* (2006.01)
*B65D 25/38* (2006.01)
*B65D 25/16* (2006.01)
*B65D 25/18* (2006.01)

(52) U.S. Cl.
USPC ........ 210/767; 210/248; 210/484; 220/908.1; 220/DIG. 6

(58) Field of Classification Search
None
See application file for complete search history.

(56) References Cited

U.S. PATENT DOCUMENTS

| | | | |
|---|---|---|---|
| 1,792,356 A | | 2/1931 | Boiseau |
| 1,886,406 A | * | 11/1932 | Kniffin ............................. 383/9 |
| 2,092,969 A | * | 9/1937 | Gustafson et al. ........ 229/117.29 |
| 2,159,192 A | * | 5/1939 | Werdin ............................ 383/76 |
| 2,798,636 A | * | 7/1957 | Ketchledge ................... 220/626 |
| 3,094,810 A | * | 6/1963 | Kalpin ............................. 47/73 |
| 3,185,339 A | * | 5/1965 | Fleming ................... 220/495.06 |
| 3,546,327 A | * | 12/1970 | Ruda ............................. 264/156 |
| 3,934,999 A | * | 1/1976 | Meier ................................ 71/9 |
| 4,058,479 A | * | 11/1977 | White et al. .................... 588/16 |
| 4,105,412 A | | 8/1978 | Petzinger |
| 4,619,361 A | * | 10/1986 | Thomas, Jr. ................... 206/204 |
| 4,742,908 A | * | 5/1988 | Thomas et al. ................ 206/204 |
| 4,747,701 A | * | 5/1988 | Perkins ........................... 383/33 |
| 4,748,905 A | * | 6/1988 | Langdon ......................... 100/90 |
| 4,813,791 A | * | 3/1989 | Cullen et al. .................... 383/40 |
| 4,815,590 A | * | 3/1989 | Peppiatt et al. ................ 206/204 |
| 4,919,546 A | * | 4/1990 | Imazeki et al. ................. 383/33 |
| 4,978,231 A | * | 12/1990 | Ling et al. ....................... 383/11 |
| 4,984,907 A | * | 1/1991 | Power ........................... 383/109 |
| 5,048,171 A | | 9/1991 | Bidwell et al. |
| 5,118,005 A | | 6/1992 | Onodera |
| 5,130,152 A | * | 7/1992 | Alameda ....................... 426/106 |
| 5,174,468 A | * | 12/1992 | Holderman ................... 220/571 |
| 5,181,619 A | * | 1/1993 | Noble ........................... 209/702 |
| 5,184,574 A | | 2/1993 | Kirk et al. |
| 5,199,795 A | * | 4/1993 | Russo et al. .................. 383/113 |
| 5,213,141 A | | 5/1993 | Dorman |
| 5,265,755 A | * | 11/1993 | McArthur et al. ............ 220/601 |
| 5,403,740 A | * | 4/1995 | Menefee et al. ........... 435/290.1 |
| 5,404,999 A | * | 4/1995 | Bednar ......................... 206/204 |
| 5,415,475 A | * | 5/1995 | Sandy ............................... 383/8 |
| 5,492,705 A | * | 2/1996 | Porchia et al. ................ 426/106 |

(Continued)

*Primary Examiner* — Robert James Popovics
(74) *Attorney, Agent, or Firm* — Wyatt, Tarrant & Combs, LLP; William S. Parks

(57) ABSTRACT

A system to permit separation of liquid and solid refuse in a single trash bin receptacle to facilitate the reliable sanitary disposal of such mixed items is provided. The overall system includes a trash receptacle device for deposit and separation of liquid and solid refuse including a reservoir for separated liquids as well as an easy-to-use and -operate liquid removal component, and a removable thermoplastic, flexible collection bag with appropriately located openings that allow for fluid transfer via gravitational forces and yet still retains suitable dimensional stability to collect and retain substantially all deposited solid refuse during further transport. Such a new system is particularly useful in retail settings (i.e., restaurants, bars, hospitals, fast food places, and the like) wherein quick clean-up of patrons' refuse is necessary without the requirement for inefficient separation of liquid and solid items by hand. Such a viable, reliable and effective liquid/solid separation system as well as the method of use of such a device is encompassed within the instant invention, as is the novel collection bag on its own.

2 Claims, 3 Drawing Sheets

(56) References Cited

U.S. PATENT DOCUMENTS

| | | | |
|---|---|---|---|
| 5,507,248 A * | 4/1996 | Gabbert | 119/166 |
| 5,660,868 A * | 8/1997 | Yeager | 426/124 |
| 5,785,428 A * | 7/1998 | Mazzocchi | 383/103 |
| 5,897,018 A | 4/1999 | Pruitt | |
| 6,053,354 A | 4/2000 | Niemeyer | |
| 6,135,637 A * | 10/2000 | Kim | 383/103 |
| 6,637,233 B1 | 10/2003 | Flum | |
| 6,705,575 B1 * | 3/2004 | Hoy | 248/99 |
| 6,808,081 B1 * | 10/2004 | Citro | 220/772 |
| 6,874,936 B2 * | 4/2005 | Gillis et al. | 383/22 |
| 7,314,553 B1 * | 1/2008 | Barbe | 210/232 |
| 7,392,909 B1 * | 7/2008 | Conrad | 210/471 |
| 7,490,787 B1 * | 2/2009 | Salazar | 241/62 |
| 7,516,852 B1 * | 4/2009 | Rehurek | 209/630 |
| 7,588,370 B2 * | 9/2009 | Paleschuck | 383/121 |
| 7,806,593 B2 * | 10/2010 | Toporski | 383/33 |
| 7,820,045 B2 * | 10/2010 | Caughman, Jr. | 210/232 |
| 8,109,409 B1 * | 2/2012 | MacMurray | 220/651 |
| 8,277,121 B2 * | 10/2012 | Bell et al. | 383/210 |
| 2002/0079238 A1 * | 6/2002 | Wilson et al. | 206/204 |
| 2003/0178430 A1 * | 9/2003 | Wentz et al. | 220/505 |
| 2003/0226773 A1 * | 12/2003 | Shaffer | 206/204 |
| 2006/0233468 A1 * | 10/2006 | Jacoby et al. | 383/40 |
| 2007/0095839 A1 * | 5/2007 | Stone | 220/495.06 |
| 2008/0135557 A1 | 6/2008 | Williams | |
| 2008/0173336 A1 | 7/2008 | Rosenblatt et al. | |
| 2008/0179329 A1 * | 7/2008 | Brooks et al. | 220/495.06 |
| 2010/0096389 A1 | 4/2010 | Volpe et al. | |
| 2010/0187135 A1 * | 7/2010 | Broering et al. | 206/204 |
| 2011/0079598 A1 * | 4/2011 | Bally et al. | 220/571 |

* cited by examiner

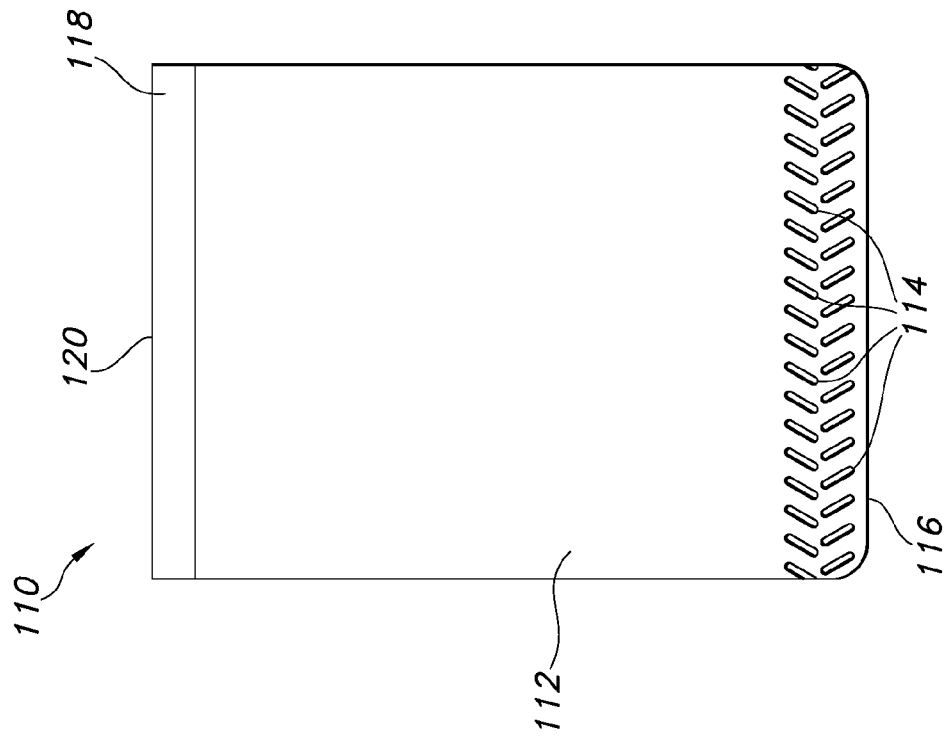
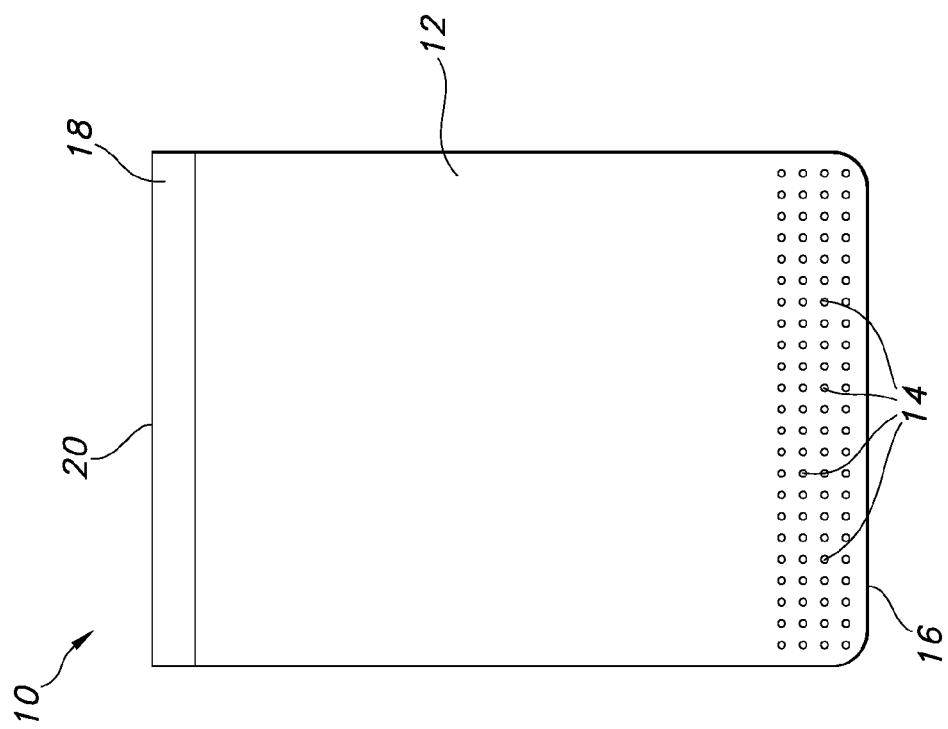

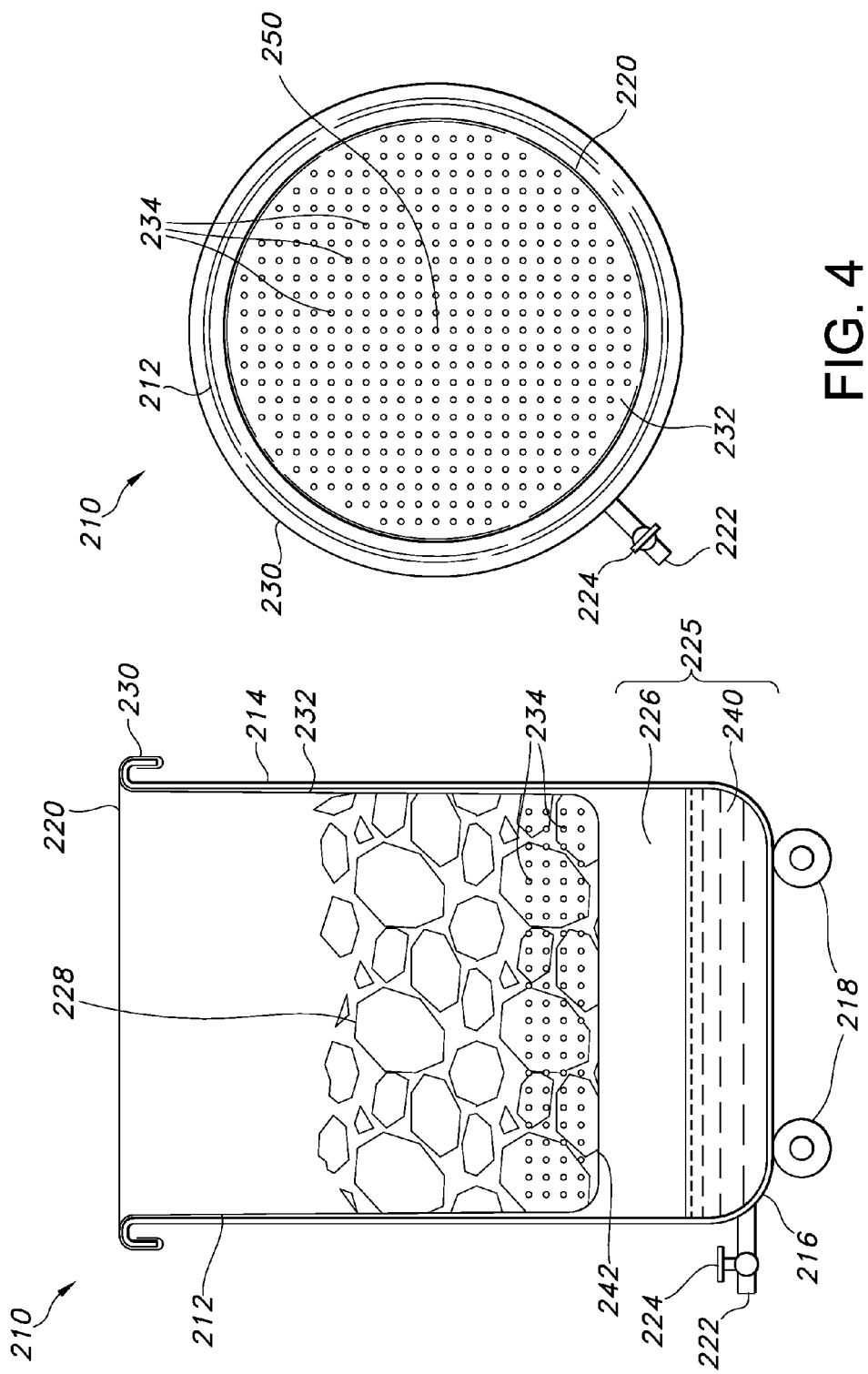

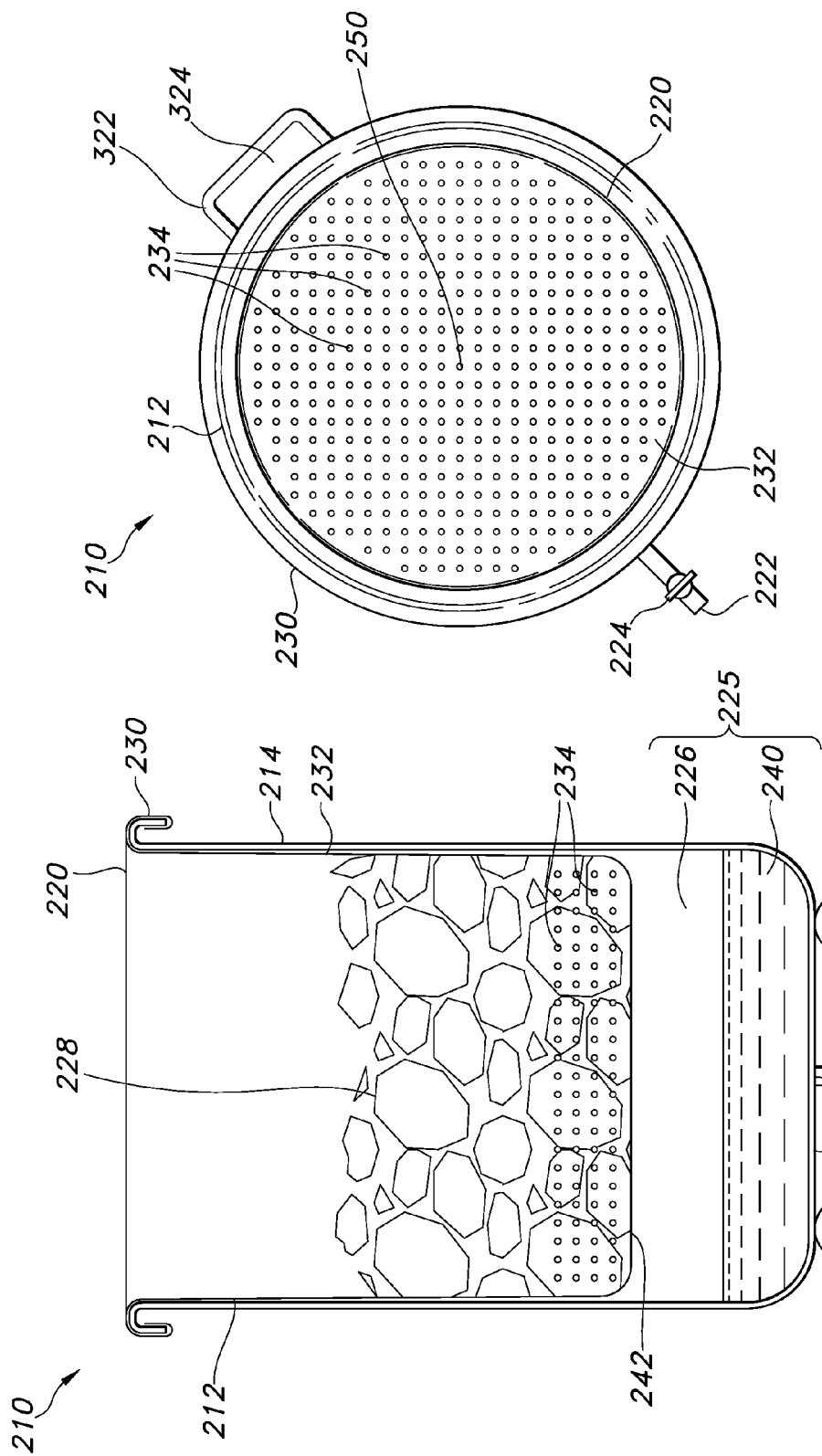

LIQUID/REFUSE SEPARATION SYSTEM

FIELD OF THE INVENTION

The present invention concerns a system to permit separation of liquid and solid refuse in a single trash bin receptacle to facilitate the reliable sanitary disposal of such mixed items. The overall system includes a trash receptacle device for deposit and separation of liquid and solid refuse including a reservoir for separated liquids as well as an easy-to-use and -operate liquid removal component, and a removable thermoplastic, flexible collection bag with appropriately located openings that allow for fluid transfer via gravitational forces and yet still retains suitable dimensional stability to collect and retain substantially all deposited solid refuse during further transport. Alternatively, the system includes as well an integrated chute to allow for a user to pour liquids directly into the reservoir at the mouth opening of the receptacle to bypass introduction of large amounts of fluids into the collection bag. Such a new system is particularly useful in retail settings (i.e., restaurants, bars, hospitals, fast food places, and the like) wherein quick clean-up of patrons' refuse is necessary without the requirement for inefficient separation of liquid and solid items by hand. Such a viable, reliable and effective liquid/solid separation system as well as the method of use of such a device is encompassed within the instant invention, as is the novel collection bag on its own.

BACKGROUND OF THE INVENTION

Typically, restaurants, bars, and other like retail establishments, must deal with quick removal of patron refuse from a table in order to allow for other patrons to enjoy a meal or a drink at the same location. Such rushed movement allows for greater profitability for such an establishment by permitting a greater number of patrons to partake of the establishment itself in such a manner. In such situations, however, such quick movement and thus removal of prior patrons' refuse involves collection by hand or in a transfer tub for separation of utensils, glassware, plates, and other washable items, from actual refuse that requires disposal. In such an atmosphere, such disposable refuse generally includes solid components (napkins, plastic cups, plastic utensils, paper plates, and the like) and liquids (water, alcohol, soda, and the like), as well as foodstuffs. Even if the plates and glasses are separated for subsequent cleaning, such liquids are sometimes poured into a trash bin rather down a sink (in some locations, alcohol is avoided from sinks for various reasons, as one example). In any event, typical situations for such retail establishments include the collection of both solid and liquid refuse into single trash bins, if not collection bags, for further transfer into a larger collection device (i.e., a dumpster).

Likewise, other establishments, such as movie theaters, sport stadiums, concert venues, and the like, basically any place that houses events wherein patrons may purchase beverages or food items in disposable containers, at least, are prone to similar situations. Much like the need for quick turnover in restaurants or bar settings, patrons may purchase a drink at such events and not finish imbibing such and decide to dispose of the remainder by disposing of the cup with the residual liquid inside.

The potential for any of these situations to involve the generation of appreciable amounts of both solid and liquid refuse within a single trash bin, and, more pointedly, within the same trash collection bag, thus requiring care in transfer to a larger refuse receptacle (again, a dumpster, as one example). Transfer of such collection bags from within an enclosed area to such an outdoor larger receptacle creates a significant potential for piercing or otherwise damaging the collection bag, thus resulting in a trail of various liquids that would require further cleaning, if not causing potential health concerns in the area in question (hospital settings may also pose the same type of potential problem with heightened health issues). Otherwise, the only other potential manner of removing such coupled refuse is through the transfer of the entire receptacle, rather than the collection bag alone. Such an alternative is not easy to accomplish as the bulky nature of such receptacles, particularly in retail or event settings, requires significant force to maneuver and lift such a container and still the potential for undesirable leaking or dripping of potential hazardous liquids during transfer to a larger receptacle (not to mention the potential for collection of such liquids in unwanted fashion within the larger receptacle itself; with the necessity of lifting such large containers by forklift-type machines and/or trucks, and the inability to control liquid transfer in such a scenario, the potential for significant liquid contamination outside the hoped-for safety of such large receptacles is virtually nonexistent as well).

Thus, there is a definitive need to provide the restaurant and bar industry, not to mention the large events, hospital, even the home trash disposal industry with the capability to easily provide solid and liquid refuse separation without having the user do so by hand and in a manner that is efficient, safe, and reliable. The prior art primarily discloses methods of providing different trash bins with liquid collection components that may be easily accessible for the liquid to be removed. Otherwise, the only other discussion of liquid and solid separation is with regard to paper bags that are subjected to loss of dimensional stability upon the presence of sufficient liquid therein and thus require specific trash bin structures with components upon which such bags must be placed for bag resiliency to remain in effect when in use. There is nothing provided, however, within the prior art that discloses or suggests the utilization of a properly configured thermoplastic collection bag with suitable opening integrated therein for liquid removal through gravitational forces alone and that retains the necessary dimensional stability and strength to permit collection of solid trash, removal of the entire collection bag from the trash bin, and transfer of the entire refuse-containing collection bag to a different trash receptacle. The prior art, as well, lacks any teaching to a receptacle configuration that includes an integrated chute present therein that allows for such a bag to be placed over the receptacle mouth opening and permits not only the placement of solid refuse within such a bag, but also permits the user to pour the majority of liquid contents from solid refuse into the chute itself, thus bypassing introduction within the collection bag. Nor does the prior art provide such a bag device in conjunction with a suitable trash bin configured to allows for collection of such removed liquids and ease in not only movement of the receptacle, but reliable means to retain the liquids therein without appreciable leakage and means to allow for reliable transfer of such liquids to a proper location for further disposal. The present invention thus overcomes these deficiencies.

ADVANTAGES AND DESCRIPTION OF THE INVENTION

It is thus an advantage of the present invention to provide a manner of separating liquid and solid refuse through placement and gravitational forces alone. Another advantage of the invention is the capability of the overall separation system to permit such liquid removal while also providing a reliable transfer bag for transporting the remaining solid refuse to a larger container without any appreciable liquid presence therein. Yet another advantage of this invention is the facilitation of liquid removal from the initial trash container into a suitable sanitation location without any appreciable leakage or other undesirable result.

Accordingly, this invention thus encompasses a multi-ply thermoplastic trash bag having an internal portion and a large opening permitting the placement of refuse therein, said bag exhibiting a thickness of at least 0.1 mm (roughly 0.4 mil) at its thinnest measurement between said internal and external portions, said trash bag including multiple miniature openings present therein within at least a portion of said bag that are of proper size to permit transfer of liquids therethrough said openings from said internal portion to a location external of said bag but not to permit solid refuse placed within said bag to transfer through the same openings, said bag further capable of withstanding a minimum of 5,000 psi (roughly 35 $kN/m^2$) tear strength (preferably at least 6,000 psi, and more preferably at least 8,000 psi) and at least 200% elongation at break upon introduction of solid refuse therein. Additionally, this invention encompasses a thermoplastic trash bag as described above with a reinforcement component included therein in the location of said multiple miniature openings, wherein the reinforcement component alternatively includes openings therein as well to permit liquid transfer therethrough but not solid refuse transfer. As well, the overall liquid/solid refuse separation system includes a container including one or more walls defining an internal cavity with a top open end and a closed bottom end, said top open end including a periphery to which said trash bag may be releasably attached and from which said trash bag will extend from and into said internal cavity when attached in such a manner, said container including a reservoir component within said closed bottom end for the accumulated liquid separated from the solid refuse and transferred from the subject trash bag, said reservoir component further including a means for the selective transfer and removal of any liquid present therein to a location external to the internal cavity of said container, wherein said subject trash bag will not come into contact with said closed bottom end of said container when releasably attached to said top end of said container. Alternatively, the bag may include absorptive particles (such as silica gel particles, as one non-limiting example) adhered to the inner walls thereof, or sprinkled therein after solid refuse introduction has commenced, that may soak up excess liquids in contact therewith during use to aid in reducing liquid egress through the holes in the bag, if needed. As another alternative, the system may include an integrated chute within the structure of the trash receptacle that leads from the mouth thereof directly to the reservoir in the bottom area; such a chute would allow for the bag to be properly placed over the mouth of the receptacle without obstacle to access of the chute to permit the user to pour larger amounts of fluids from the solid refuse therein for direct delivery to the reservoir, thus bypassing the bag to a large extent. In that situation, however, residual fluids would be introduced within the target bag and would be subject to transfer through gravitational forces, as discussed above, if necessary. Furthermore, the overall liquid/solid refuse separation and transfer system accorded through such an inventive trash bag/container combination is encompassed within this invention as well.

The inventive trash bag must exhibit a propensity to remain dimensionally stable when solid refuse is introduced therein such that the weight and shape of solid objects of such type will not effectively puncture or otherwise destroy the integrity of the bag itself to retain and permit transport of such solid refuse subsequent to draining of liquid components therefrom when present within the subject receptacle. The minimum force capacity noted above thus provides a sufficiently resilient bag that allows for solid refuse transfer subsequent to liquid removal therefrom and thus permits removal from a trash receptacle for transfer to a larger collection place for large-scale bagged refuse removal (i.e., a dumpster, or like device). The placement and shape of the miniature openings are thus important to guarantee such a necessary structural integrity result while simultaneously permitting gravitational removal of liquid refuse introduced within the bag as well. The initial shape of the openings thus may be of any geometry, with round (having diameters of at most 5 millimeters) or elongated thin slits (having a length of at most about 1.5 centimeters and a width of at most 2 millimeters, preferably less for both dimensions) potentially preferred (rhombus, square, triangular, and other like geometric shapes, may be utilized as well; the only rationale for preferring round or thin slits is the general ease in manufacturing with such shapes within the subject bag), and spaced an appropriate distance apart (from about 0.5 to about 1.2 centimeters, for instance, for geometrically shaped holes and from about 0.7 to about 1.5 centimeters, for instance, for elongated slits). The critical distance between and size and shape of such openings thus allows for maximum liquid refuse removal through gravitational forces with the minimum necessary number of openings for complete access for all available liquid refuse to transfer therethrough while best ensuring the integrity of the subject trash bag is not compromised during introduction of solid refuse as well. For that purpose, the number of openings should be limited to the area limited to that substantially opposite the mouth opening of the bag; since the mouth opening will be placed around the perimeter of the opening of the trash receptacle itself, and thus the refuse deposited therein will stack up from the area opposite the mouth opening, the lowest point of the bag itself when present within the receptacle would be such an opposite area. As the subject bag itself will be substantially symmetrical in shape, the accumulation of miniature openings will be configured in relation to the midpoint of the closed end opposite the mouth opening thereof. In such a manner, the overall number of miniature openings will total a number that allows for roughly from about 0.1 to about 0.5 $m^2$ in area of voids within the bag surface, with the maximum size of such individual openings being roughly 20 $mm^2$ in area, and the number of such openings from about 30 to about 150. Geometrically shaped openings should exhibit areas of from about 3 to about 20 mm2 and elongated slits from about 5 to about 10 mm2. Combinations of both types of openings, as well as a variety of different geometric shapes for such openings, may be utilized as well. The openings may radiate in a symmetric pattern from the midpoint of the closed end of the subject bag or they may be provided in row fashion with any number of rows included to provide the necessary liquid transfer without compromising the strength of the overall trash bag for solid refuse retention and transport. Such measurements, thus, must permit a minimum force of X newtons to be applied to any area of the subject bag without rupture or other type of loss of dimensional stability therein. As the openings should be centered in the closed end region of the subject bag, it should be evident that including openings within other areas of the bag would reduce the overall bag strength and not provide any further benefit for liquid refuse transfer as the liquids would much gravitationally to the lowest point of the bag, rather than escape through openings present within the side of the bag (however, to allow for vacuum resistance or aeration of the subject bags, openings may be provided in other areas of the bag additionally as long as the overall bag strength and resiliency is not compromised). Such a lowest point for the subject bag would thus be the accumulation location for liquid refuse, thus being the appropriate placement of the miniature openings (herein defined as openings of sufficiently small size to permit liquid transfer but not solid refuse transfer therethrough and defined in terms of dimensions above) to allow for the liquid refuse to drain as necessary into the reservoir component of the subject trash receptacle. Additionally, the weight of such solid refuse would tend to expand the thermoplastic flexible bag in such a manner as to increase the size of such miniature openings with greater opening sizes created with greater amounts (and thus mass) of solid refuse deposited therein as well. Thus, as noted above, very small openings in the subject trash bag are preferred since the increased weight of solid refuse would invariably lead to greater diameters in the liquid refuse transfer points (i.e., the miniature openings) in such a situation. Thus, in order to best ensure the subject bag does not lose its integrity as greater amounts of solid refuse are introduced therein, the appropriate distance between openings, as well as proper shape and effective number of plies for the thermoplastic structure must be met as a critical measure of success for the subject bag itself. The closer together the openings, the smaller the openings and/or the greater number of plies in the bag are needed to retain the desired level of structural integrity throughout the bag's useful lifetime. As alluded to above, an inordinate amount of solid refuse, or solid refuse with sharp edges (for instance), may contribute to bag structure failure; the presence of multiple openings within the bag structure would usually lead to a low threshold of pressure and/or concentrated force (again, such as sharp or strong edges) needed to tear or otherwise destabilize the thermoplastic bag structure. The proper selection made in terms of the inventive configurations of miniature openings, as noted above, has led to the provision of trash bags that will permit liquid transfer therethrough, but will exhibit similar tear strengths and resiliency measurements as thermoplastic trash bags without any such openings present.

If desired, the subject flexible, thermoplastic trash bag may include a reinforcement component within the area in which the miniature openings are located to reduce the propensity for potential tearing or other reduction in bag integrity during use. Such a reinforcement may be of any type to increase the tear strength at and around the individual openings or may be of a type that provides an overall increase in structural integrity within that specific area of the subject bag. Thus, individual attachments around each opening (or increases in bag thickness around the periphery of such openings) may be employed for such a purpose. In such a manner, there is no impediment to liquid egress through the miniature openings when the bag is in use and structural integrity is provided to a greater degree than without such surrounding reinforcements in place. Rubber or coated paper grommet-shaped reinforcement materials may thus be attached around round (or other geometrically shaped) openings; rubber of coated paper strips may be applied on either side of elongated slits in the bag, if desired as well. As well, and potentially preferred, however, is the inclusion of strips of reinforcement materials over the internal portion of each bag in the areas of such miniature openings. Thin rubber mesh strips, for instance, may be attached in the bag areas including such openings to allow for increased bag strength in those specific locations as well as permitting liquid egress through both the mesh and the miniature openings. Other possible reinforcement materials include patterned, connected, grommet-shaped (or like geometrically shaped outlines dependent on the opening shapes themselves) materials (such as lattice-work materials) for placement over the area of the subject bag including the miniature openings, but not covering the opening themselves. In any event, the potential for reinforcement inclusion permits an increase in resiliency in the subject bag if so desired.

The subject trash bag itself should not reach all the way to the bottom portion of the subject receptacle in order to ensure that once the liquid refuse transfers through the miniature openings that the bag itself remains in a dry state. As such, the bag should be releasably attached to the periphery of the subject trash bag opening in some manner (either through folding over a lip in the periphery, or possibly including clamps of some type around the periphery for such a purpose) and extended downward into the trash receptacle cavity with the bottom of the bag present at a height at least about 30 centimeters (roughly 1 foot) above the reservoir portion (a/k/a, the bottom of the inner cavity) of the subject trash receptacle to allow for extension of the flexible bag further into the receptacle upon introduction of solid and liquid refuse over time. At that initial height, the chances of excessive extension of the flexible bag into the reservoir portion is lessened, thereby, as noted above, best ensuring that upon removal of liquid refuse through gravitational forces the bag itself remains at a position above the liquid refuse within the reservoir portion. Even if, however, the bag either extends further than desired, or the liquid level is higher than expected within the reservoir, and thus the bag becomes partially exposed to the removed liquid refuse, the thermoplastic nature of the bag itself reduces propensity for liquid retention and accumulation at the bag surface, thereby permitting removal of substantially all liquid refuse through manipulation upon removal of the bag from the trash receptacle itself (i.e., shaking, or other like forceful movements). As well, there may be cups or other like solid refuse items present within the used trash bag that may include liquids that have not been allowed to escape through purely gravitational means during placement within the subject trash receptacle. Further manipulation as noted above may dislodge or otherwise move such solid refuse items to permit liquid escape prior to trash bag removal to prevent unwanted leakage of liquid refuse at that time. The user may, however, compensate easily for such a potential problem by directing any persons depositing refuse into the bag to pour out all liquid contents into the subject trash bag prior to deposit of solid refuse as well.

Such thermoplastic flexible trash bags may be produced and manufactured through any typical manner, initially and prior to creation of the miniature openings therein. Typical manufacturing methods include film extrusion, blown film production, calendaring (to a certain extent), and the like, to form thermoplastic panels that may then be adhered together in some fashion to form a multi-ply structure. The multi-ply panels may then be adhered together at angles to form the bag structure as needed, as well. The miniature openings may be created subsequent to the multi-ply panel creation step through the application of properly configured punch devices to create the desired shape and configuration pattern of openings within the target panels. If elongated slits are formed, properly situated knives or like devices with suitable sharp edges may be employed and contacted for the necessary distance and duration to create the desired slit designs as needed. If an automated method is not desired, proper application of punches and knives (and the like) may be utilized to accord the necessary miniature openings within the panel structures as well.

Preferably, then, film extrusion may be employed to produce multiple film panels that may be adhered together to form a multi-ply structure. In such a typical bag production method, initially a thermoplastic tube is extruded in a machine direction, flattened, and then slit in half along a center line. Each half of the tube includes a pair of pliable thermoplastic sheets joined to each other, along a bottom disposed in the machine direction. The sheets are separable from each other along a mouth end formed opposite the bottom. Second, the sheets are passed through a static folding mechanism in the machine direction to produce a hem on each sheet along the mouth end to facilitate releasable attachment to the subject mouth periphery of the trash receptacle. As noted above, then, the creation of the miniature openings within the subject bags, as well as the optional reinforcement components therein, may be undertaken prior to sealing of the different sides together to form the bag structure or subsequent to bag structure completion. In any event, the proper manner of opening creation is preferably undertaken subsequent to bag creation with a properly aligned and configured punch or slice device in place over the closed end (opposite the mouth end) of the bag itself. The punch device may be a cylinder of uniformly spaced pins rotating while the bag (either individually or in multiples) is move through a manufacturing line. As well, uniformly spaced edges on such a cylindrical device may be employed in a like manner for elongated openings therein. Additionally, such openings may be created through any other typical manner, including individual hole punching and/or slicing. The resultant bags may then be packaged in a dispensing box for sale to consumers if desired, or provided in any other typical bag offering manner in a commercial sense.

With respect to the bags themselves, the panels thereof may be made from a variety of different thermoplastic materials (a term intended to encompass polymeric films that are modifiable in form upon the exposure to a sufficient high temperature heat source), including, without limitation, linear low density polyethylene (LLDPE), low density polyethylene (LDPE), high pressure polyethylene (HPPE), high molecular weight high density polyethylene (HDPE), polyester, polystyrene, polylactic acid, or blends of these polymers. In addition, the body panels may be composed of coextruded films uniting two or more of the above polymers. Each panel preferably has a thickness ranging from about 0.4 mil to about 2 mils, with about 1 mil to 2 mils particularly preferred, and a ply structure of at least 2, preferably at least 3, and most preferably from 2 to about 10 (the term multi-ply indicates at least 2 in this context). The bags are generally provided to the user in the form of a roll of interconnected bags or as pre-separated bags housed in a dispensing box. When the bags are provided in the form of a roll, the closed end of the bag is thermally sealed and connected to its neighboring bag along a perforated line, generally; the other end of the bag, the open mouth end, is attached to its neighboring bag solely along another perforated line. When the bags are pre-separated, neighboring bags are generally overlapped or interweaved in such a manner that removal of one bag from the dispensing box draws the neighboring bag toward an opening in the box.

The mouth end of the subject bag is structured to permit, as noted above, releasable attachment to the mouth periphery of the subject trash receptacle, and thus may include a separate reinforcement portion if desired for such a purpose. Typically, however, the mouth end of the bag will not include any such reinforcement, but will be resilient enough to permit the user to close the entire mouth edges together as a means to prevent egress of the solid refuse present therein and to utilize a separate tie down device for such a purpose. Alternatively, if desired, the bags may be manufactured with a drawstring or looped end feature to provide a simpler manner of closing or tying off the mouth end thereof as well as to facilitate transport from the trash receptacle to a larger receptacle (i.e., a dumpster, and the like) by hand. The bag may also include an incorporated adhesive strip along the inner periphery of the mouth to allow for closure through adhesion means. The thermoplastic may also be infused with a scent to mask odors, or charcoal or like materials to capture odors, within the bag, if desired.

The inventive system thus also includes a properly configured trash receptacle that includes a reservoir component for liquid refuse accumulation and means to facilitating liquid refuse removal particularly without any need to tilt or otherwise manipulate such a receptacle in a manner that requires possible difficulties by having to lift or possibly drop the receptacle. To that end, the receptacle includes an egress port for liquid refuse provided at the lowest point available to permit as complete liquid refuse removal as possible. Thus, the receptacle may include any number of configurations to meet such a requirement, such as, without limitation, a sealed opening, a hose port (with a valve to control timing and volume of liquid transfer), or any other like device to permit selective removal. The egress port may be of any configuration that permits and facilitates selective liquid refuse removal from the trash receptacle itself. Such a port may be operable through a foot pedal or like device that allows the user to maneuver the receptacle to a proper location without fear of unwanted leakage from the receptacle until operated thereby. Likewise, the port may be attached to a hand operated device that allows for similar selective control, either present near the receptacle mouth opening or down near the bottom end (reservoir) thereof. A valve device may be employed for such a purpose as well, again allowing for hand operation on demand. The port may be present on the side external wall of the trash receptacle or may be present on the underside of the reservoir itself, as well.

The receptacle itself may be formed from any suitable material such as, for example, a metal (e.g., sheet metal, aluminum, alloys), a rigid polymer (e.g., high density polyethylene, rubber, etc.), and/or combinations thereof. The receptacle should be of proper composition to compensate for heavy duty usage, yet permit easy movement thereof to locations as needed for liquid disposal therefrom. As noted above, the mouth opening of the receptacle should be properly configured to allow for releasable attachment of a subject bag around the periphery thereof. If desired, clamps, wires, and the like, may be employed for such a purpose as well.

Although the subject bag may properly extend into the trash receptacle without need for any support underneath for its structural integrity during use, the user may employ a support of some type if desired. If such is wanted, a proper rigid screen device may be utilized in particular to ensure the bag does not become submerged in any liquid refuse, specifically if the amount of liquid refuse is rather voluminous at any point in time. The screen thus allows for the passage of liquid refuse therethrough and yet permits support for this purpose simultaneously.

The trash receptacle may also include any type of movable device underneath the reservoir and external to the body thereof to facilitate transport of the receptacle to a different location on demand. Thus, wheels, rudders, bearings, and the like, may be present for such a purpose. Additionally, the subject container may further include one or more axles to which one or more wheels may be attached for this purpose as well.

As alluded to above, the trash receptacle may also include an integrated chute therein that leads directly to the fluid reservoir area in order to bypass fluid introduction (to a large degree, at least) within the separator collection bag to reduce the propensity of fluid retention in the bag that may leak undesirably out during removal from the receptacle and transfer to another location. Such a chute may be integrated in such a fashion as to be accessible at a location external the mouth of the receptacle (and thus allowing for placement of the bag over the mouth without incident or obstacle) and formed to basically be a channel leading downward and then within the receptacle body. Alternatively, the chute may be integrated into the mouth of the receptacle and the user may conveniently configure the subject bag around the mouth as to avoid covering the opening of the chute during use. In any event, such a component permits the user to pour fluid contents through the chute and dispose of the solid refuse within the collection bag, thereby allowing for the vast amount of liquids and fluids to bypass collection bag introduction, if desired.

The typical manner of introduction of a trash bag into and onto a trash receptacle may be employed to incorporate the subject bag within the overall liquid/solid refuse separation device and system. With the mouth opening of the subject bag applied over the mouth opening periphery of the trash receptacle, the user may then simply deposit refuse of any type within the overall device to initiate separation of liquids from solids through gravitational force application. Liquids will escape as permitted from the solid refuse deposited therein and seek the lowest point possible within the bag. As the miniature openings are present therein, the liquids present will then seek any further location possible thereby leading to egress through the openings and into the reservoir within the trash receptacle. Upon deposit of any desired amount of refuse within the subject device, bag and receptacle, the user may then detach the bag including solid refuse therein from the receptacle and transport the same to a larger receptacle for complete removal without liquid refuse escaping therefrom during such transport. As well, substantially all of the liquid refuse deposited therein will be present within the receptacle reservoir allowing for the user to then maneuver the receptacle to any location and place the egress port from the reservoir over or near a liquid refuse collection location. Subsequently, the user may then selectively operate the egress port (such as through a valve, as one example) to release and remove the liquid refuse therein to the collection location (such as a sewer system, or like place). The user my then maneuver the receptacle back to a selected location and place another, unfilled subject bag around the mouth opening periphery thereof to restart the entire process.

The trash receptacle may be configured to be permanently placed in a specific location (or semi-permanently placed) such that maneuvering is not possible. Such a device is well within the scope of this invention as the receptacle may still include a selectively operated egress port for liquid refuse removal at that specific location as well.

Furthermore, the device may include a cardboard receptacle with a water-impermeable reservoir present therein, if desired, to allow for outdoor festival or concert venues to utilize less expensive materials for refuse disposal, but also allow for proper liquid and solid refuse separation for improved sanitary conditions. As well, the overall device may include an enclosed mouth opening for the trash receptacle such that a user must push a door or like component open for deposit of refuse therein. Such is well within the purview of this invention as the bag may be properly placed in such a receptacle and a reservoir for liquid refuse collection may be present therein as well. In other words, any typical configuration of a trash receptacle to which a trash bag may be releasably attached may be employed for this purpose that includes the capability of liquid/solid separation as presented herein. Additionally, the utilization of the inventive subject bag described herein allows for the omission of any holes or like structures within the receptacle walls for the prevention of vacuum formation when a bag is inserted therein. The openings themselves provide such a benefit and thus allows for improved bag insertion, application, and removal as well as proper liquid/solid refuse separation. The thermoplastic nature of the subject bag, as well, militates against any, damage to the bag itself from liquid exposure as well. AS discussed above, paper bags would be susceptible to destruction or at least loss in structural integrity due to liquid exposure. Such thermoplastic materials overcome such a problem and yet, with properly aligned miniature openings present therein, still retain acceptable levels of dimensional stability to prevent loss of resiliency during use and solid refuse transport thereafter.

BRIEF DESCRIPTION OF THE DRAWINGS

Embodiments of the present system will now be described, by way of example, with reference to the accompanying drawings, wherein:

FIG. 1 is side view of a potentially preferred inventive trash bag with round hole miniature openings present therein.

FIG. 2 is a side view of a potentially preferred inventive trash bag with elongated slit miniature openings present therein.

FIG. 3 is a cross-sectional view of a potentially preferred inventive liquid/solid refuse separation device with the trash bag of FIG. 1 present therein and including a side valve egress port for liquid refuse removal.

FIG. 4 is a cross-sectional view of a potentially preferred inventive liquid/solid refuse separation device with the trash bag of FIG. 1 present therein and including a bottom hose valve egress port for liquid refuse removal.

FIG. 5 is an aerial view of a potentially preferred inventive liquid/solid refuse separation device with the trash bag of FIG. 1 present therein.

FIG. 6 is an aerial view of a potentially preferred inventive liquid/solid refuse separation device with an integrated chute included for direct liquid introduction and with the trash bag of FIG. 1 present therein.

DETAILED DESCRIPTION OF THE DRAWINGS AND PREFERRED EMBODIMENTS

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

FIG. 1 depicts a side view of an inventive trash bag 10 with a mouth opening, a peripheral mouth opening edge 18, a closed end 16, side panels 12 (the other panel is not illustrated). The closed end 16 includes a plurality of geometrically shaped miniature openings 14 (here in circular configurations) exhibiting roughly 3 millimeter diameters each (thus exhibiting approximately 7 mm² areas each). In this manner, the openings 14 radiate from the midpoint of the closed end 16 (more noticeable in FIG. 4). FIG. 2 thus shows an inventive bag 110, with similar structures as a mouth opening 120, a mouth opening edge 118, a closed end 116, and side panels 112 (one is illustrated). In this depiction, however, a plurality of elongated slits 114 are provided with an approximate length of 7 mm and width of 1 mm (thus individual areas of 7 mm²). In both FIGS. 1 and 2, the miniature openings (14 of FIGS. 1 and 114 of FIG. 2) are configured to allow for maximum liquid refuse transfer through gravitational force with retained dimensional stability to allow for at least 35 kN/m² force to be applied overall to the subject bag without tearing through solid refuse deposition therein when included within an overall liquid/solid separation device (as in FIGS. 3-5). The bag 232 has at least 4 plies of plastic (here LLDPE) and a thickness of about 0.1 millimeters.

FIG. 3 shows an overall separation device 210 in cross-section with solid refuse 228 present within the bag 232 and liquid refuse 240 separated and collected within the reservoir 225 of a trash receptacle 212. The bag 232 is attached to the mouth opening 220 of the receptacle 212 through folding of the bag mouth opening edge 230 around the mouth opening 220. The bag 232 extends into the cavity 226 of the receptacle 212 with the solid refuse 228 causing extension of the flexible bag 232 and passage of liquid refuse 240 through the miniature openings 234 present within the closed end 242 of the bag 232 into the reservoir 225. The cavity 226 is formed from the side walls 214 of the receptacle 212 and the bottom closed end 216. Attached thereto is an egress port 222 with an operable valve 224 for selective removal of liquid refuse 240 on demand. The receptacle 212 also includes wheels 218 to permit movement of the receptacle 212 as desired by the user.

FIG. 4 provides an aerial view of the same device 210 as in FIG. 3 but without any solid or liquid refuse present therein (228 and 240 of FIG. 3). The miniature openings 234 are shown are radiating from a central midpoint 250 of the closed end 242 of the bag 232 while the bag 232 is attached (releasably) to the receptacle 212 via folding of the mouth opening edge 230 of the bag 232 over the mouth opening 220 of the receptacle 212. Also shown are the egress port 222 and valve assembly 224 attached to the side walls (214 of FIG. 3) of the receptacle 212 for eventual removal of liquid refuse (240 of FIG. 3) on demand.

FIG. 5 provides a different egress port configuration 262 from that in FIG. 3 with a hose 264 attached to facilitate liquid refuse removal on demand by a user through the very bottom 216 of the receptacle 212.

FIG. 6 depicts the same basic device as in FIG. 4 except for the additional presence of an integrated chute 322 with an opening 324 present on the exterior of the receptacle 212 that leads directly from the receptacle mouth opening 220 to the reservoir 225 (as depicted in FIGS. 3 and 5) (and thus through the receptacle wall).

Thus, according to the present system, a low-cost, effective, reusable, easy-to-use, and sanitary liquid/solid refuse separation system is provided for various locations and end uses.

Certain additional advantages and features of this present system may be apparent to those skilled in the art upon studying the disclosure, or may be experienced by persons employing the novel system and method of the present system, chief of which is that a sanitary and easily cleaned trash receptacle in which fluids may be easily separated from solid refuse and separately removed as a result is provided. Another advantage of the present system is that a conventional trash bin may be easily modified to incorporate the features and advantages of the present system, as described above.

While the present system has been described with a limited number of embodiments, it will be appreciated that changes may be made without departing from the scope of the original claimed present system, and it is intended that all matter contained in the foregoing specification and drawings be taken as illustrative and not in an exclusive sense.

What is claimed is:

1. A liquid/solid refuse separation system comprising:
a container including one or more walls defining an internal cavity with an open top end and a closed bottom end, said open top end including a periphery thereabout; and
a multi-ply thermoplastic trash bag having an internal portion, an external portion and a main opening of sufficient size to permit placement of refuse into said trash bag, said bag having a wall thickness of at least 0.1 millimeters at its thinnest measurement between said internal and external portions, said trash bag wall including multiple miniature openings extending through at least a lowermost portion of said trash bag wall, said miniature openings being of sufficient size to permit passage of liquids therethrough, while not to permitting solid refuse placed within said bag to pass through said miniature openings, said trash bag further comprising a reinforcing component in the location of said miniature openings;
wherein said multi-ply thermoplastic trash bag may be releasably attached to said periphery from which said trash bag will extend from and into said internal cavity when attached to said periphery, said container including a reservoir component within said closed bottom end for accumulation of liquid separated from said solid refuse and transferred from said trash bag, said reservoir component further including a means for the selective transfer and removal of any liquid present therein to a location external of the internal cavity of said container, wherein said trash bag will not come into contact with said closed bottom end of said container when releasably attached to said periphery of said open top end of said container.

2. A method for removing liquid from a liquid/solid refuse mixture comprising the steps of:
providing the liquid/solid refuse separation system of claim 1;
introducing a liquid/solid refuse mixture into said trash bag of said separation system through said main opening; and
allowing liquid to drain out of said trash bag through said miniature openings.

* * * * *